US012725537B2

(12) United States Patent
Kishimoto et al.

(10) Patent No.: US 12,725,537 B2
(45) Date of Patent: Sep. 1, 2026

(54) DISPLAY DEVICE

(71) Applicant: Samsung Display Co., Ltd., Yongin-Si (KR)

(72) Inventors: Hirotsugu Kishimoto, Hwaseong-si (KR); Chul Ho Jeong, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 1143 days.

(21) Appl. No.: 17/343,032

(22) Filed: Jun. 9, 2021

(65) Prior Publication Data

US 2022/0093014 A1 Mar. 24, 2022

(30) Foreign Application Priority Data

Sep. 24, 2020 (KR) ........................ 10-2020-0124020

(51) Int. Cl.

| | |
|---|---|
| ***G09F 9/30*** | (2006.01) |
| ***B32B 3/16*** | (2006.01) |
| ***B32B 7/12*** | (2006.01) |
| ***B32B 27/06*** | (2006.01) |

(52) U.S. Cl.

CPC ................ *G09F 9/301* (2013.01); *B32B 3/16* (2013.01); *B32B 7/12* (2013.01); *B32B 27/06* (2013.01); *B32B 2255/26* (2013.01); *B32B 2457/20* (2013.01)

(58) Field of Classification Search

CPC .. B32B 3/16; B32B 7/12; B32B 27/06; B32B 2255/26; B32B 2457/20; G09F 9/301

See application file for complete search history.

(56) References Cited

U.S. PATENT DOCUMENTS

| | | | |
|---|---|---|---|
| 10,362,696 B2 | 7/2019 | Ahn | |
| 10,838,457 B2 | 11/2020 | Yu et al. | |
| 10,852,861 B2 | 12/2020 | Kim et al. | |
| 10,917,990 B2 | 2/2021 | Choi et al. | |
| 10,930,883 B2 | 2/2021 | Park | |
| 10,966,328 B2 | 3/2021 | Choi et al. | |
| 10,966,329 B2 | 3/2021 | Park et al. | |
| 11,523,524 B2 | 12/2022 | Myung et al. | |
| 11,609,612 B2 | 3/2023 | Park et al. | |
| 11,621,398 B2 | 4/2023 | Jeon | |
| 2016/0357052 A1* | 12/2016 | Kim | G02F 1/133305 |

(Continued)

FOREIGN PATENT DOCUMENTS

| | | |
|---|---|---|
| CN | 106816530 A | 6/2017 |
| CN | 109493732 A | 3/2019 |

(Continued)

OTHER PUBLICATIONS

Machine Translation of KR-20200091529-A (Year: 2020).*

*Primary Examiner* — Sathavaram I Reddy

(74) *Attorney, Agent, or Firm* — CANTOR COLBURN LLP

(57) ABSTRACT

A display device includes: a display module in which a first region, a second region, and a third region are sequentially defined in one direction; a first plate disposed under the first region of the display module; a second plate disposed under the third region of the display module and spaced apart from the first plate; and a cover film attached to the first plate and the second plate, where the cover film includes a low friction coating part disposed in at least a portion of a surface of the cover film.

20 Claims, 10 Drawing Sheets

(56) References Cited

U.S. PATENT DOCUMENTS

| | | | | |
|---|---|---|---|---|
| 2020/0068725 | A1* | 2/2020 | Park | H05K 5/0017 |
| 2020/0119290 | A1* | 4/2020 | Shin | H04M 1/0268 |
| 2021/0191459 | A1 | 6/2021 | Kim et al. | |

FOREIGN PATENT DOCUMENTS

| | | | | | |
|---|---|---|---|---|---|
| CN | 110415608 | A | | 11/2019 | |
| CN | 110503895 | A | | 11/2019 | |
| CN | 110853506 | A | | 2/2020 | |
| CN | 111047983 | A | | 4/2020 | |
| CN | 111445792 | A | | 7/2020 | |
| CN | 111554180 | A | | 8/2020 | |
| KR | 1020170064165 | A | | 6/2017 | |
| KR | 20180114565 | A | | 10/2018 | |
| KR | 1020190053691 | A | | 5/2019 | |
| KR | 20190081281 | A | | 7/2019 | |
| KR | 20200091529 | A | * | 1/2020 | |
| KR | 20200097854 | A | | 8/2020 | |
| KR | 1020210079461 | A | | 6/2021 | |
| TW | 201608542 | A | | 3/2016 | |
| WO | WO-2012177360 | A1 | * | 12/2012 | G02F 1/133308 |

* cited by examiner 1000
400
302
301
300
200
100
500
600
1620
720
1812
1814
820
100-3
100-2
100-1
920
70-G
910
2000
L1
1300
1200
1100
1400
1500
1610
710
1811
1813
810
DR3
DR2
DR1

1000
70-D
2000
920
910
R
FX
1811
720
1620
600
500
100
200
300
400
400
300
200
100
500
600
1610
710
1812
DR2
DR3
DR1

DISPLAY DEVICE

This application claims priority to Korean Patent Application No. 10-2020-0124020, filed on Sep. 24, 2020, and all the benefits accruing therefrom under 35 U.S.C. § 119, the content of which in its entirety is herein incorporated by reference.

BACKGROUND

1. Field

The disclosure herein relates to a display device having improved product reliability.

2. Description of the Related Art

Display devices display various images on display screens and provide users with information. In general, display devices display information within assigned screens. Recently, flexible display devices including foldable flexible display panels have been developed. Unlike rigid display devices, the flexible display devices may be folded, rolled, or bent. Flexible display devices, the shapes of which may variously be changed, may be foldable, rollable or bendable regardless of existing screen sizes and thus may have improved portability.

SUMMARY

The disclosure provides a display device having improved product reliability.

An embodiment of the invention provides a display device including: a display module in which a first region, a second region, and a third region are sequentially defined in one direction; a first plate disposed under the first region of the display module; a second plate disposed under the third region of the display module and spaced apart from the first plate; and a cover film attached to the first plate and the second plate, where the cover film includes a low friction coating part and disposed in at least a portion of a surface of the cover film.

In an embodiment, the cover film may include at least one selected from a silicone resin, a polyurethane resin, and a thermoplastic polyurethane resin.

In an embodiment, a thickness of the cover film may be about 40 micrometers (μm) to about 130 μm.

In an embodiment, the low friction coating part may include at least one selected from a fluorine resin and an acrylic resin, which is coated on the surface of the cover film.

In an embodiment, the cover film may include: a first attachment region attached to the first plate; a second attachment region attached to the second plate; and a connection region which connects the first attachment region and the second attachment region to each other, and at least a portion of the low friction coating part may be disposed in the connection region.

In an embodiment, the first attachment region of the cover film may be attached to a lower surface of the first plate, and the second attachment region of the cover film may be attached to a lower surface of the second plate.

In an embodiment, the connection region may include: a central region in which the low friction coating part is disposed; and a peripheral region adjacent to the central region.

In an embodiment, the display device may further include a first adhesive layer disposed between the cover film and the first plate; and a second adhesive layer disposed between the cover film and the second plate.

In an embodiment, the display device may further include a set part disposed under the cover film.

In an embodiment, a gap may be defined between the first plate and the second plate, and the low friction coating part may overlap the gap when viewed in a plan view.

In an embodiment, the first region and the third region may be non-folding regions and the second region may be a folding region.

In an embodiment, a portion of the first plate may be disposed under the second region, and a portion of the second plate may be disposed under the second region.

In an embodiment, the display module may be in a flat state in which the second region is flat, or in a folded state in which the second region is folded and the first region and the third region are disposed to face each other.

In an embodiment, the cover film may be a flexible film.

In an embodiment, the cover film may include: an upper surface adjacent to the first plate and the second plate; and a lower surface opposite to the upper surface, where the low friction coating part may be disposed on the upper surface.

In an embodiment, the display device may further include a window disposed on the display module and spaced apart from the first plate and the second plate with the display module therebetween.

In an embodiment of the invention, a display device includes: a display module in a flat state or in a folded state; a first plate disposed under the display module; a second plate disposed under the display module and spaced apart from the first plate; and a cover film attached to the first plate and the second plate, where the cover film includes a low friction coating part disposed on a surface of the cover film to overlap a gap between the first plate and the second plate when viewed in a plan view.

In an embodiment, the cover film may include at least one selected from a silicone resin, a polyurethane resin and a thermoplastic polyurethane resin, and the low friction coating part may include at least one selected from a fluorine resin and an acrylic resin, which is coated on the surface of the cover film.

In an embodiment, the cover film may include: an upper surface adjacent to the first plate and the second plate; and a lower surface opposite to the upper surface, and the low friction coating part may be disposed on the upper surface.

In an embodiment, the cover film may include: a first attachment region attached to the first plate; a second attachment region attached to the second plate; and a connection region which connects the first attachment region and the second attachment region to each other, and at least a portion of the low friction coating part may be disposed in the connection region.

BRIEF DESCRIPTION OF THE DRAWINGS

The above and other features of the invention will become more apparent by describing in further detail embodiments thereof with reference to the accompanying drawings, in which.

DETAILED DESCRIPTION

Figure 1A:
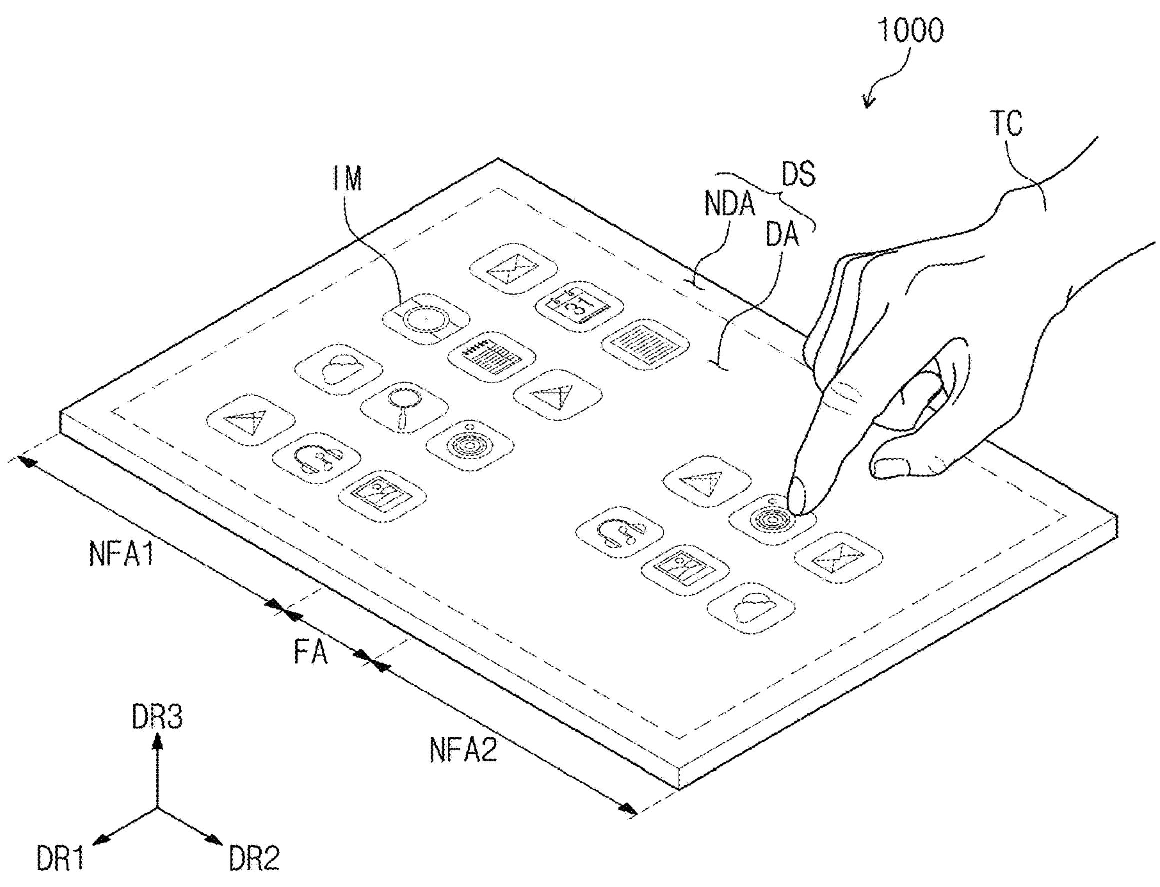
FIG. 1A is a perspective view of a display panel according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In this description, it will be understood that when an element (or a region, a layer, portion, etc.) is referred to as being "on", "connected to" or "coupled to" another element or layer, it can be directly on, connected or coupled to the other element, or a third intervening element may be present therebetween. In contrast, when an element is referred to as being "directly on", "connected directly to" or "coupled directly to" another element, there are no intervening elements present.

Like reference symbols refer to like elements. Also, in the figures, the thicknesses, the ratios and the dimensions of elements are exaggerated for effective illustration of technological contents.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Although the terms such as "first" and "second" may be used herein to describe various elements, these elements should not be limited by these terms. The terms are only used to distinguish one element from other elements. For example, without departing from the scope of the invention, a first component may be referred to as a second component, and similarly, the second component may also be referred to as the first component. Singular forms may include plural forms unless clearly defined otherwise in context.

In addition, terms such as "under", "below", "on", and "above" may be used to describe the relationship between elements illustrated in the figures. The terms have relative concepts, and are described with respect to directions illustrated in the figures.

Unless defined otherwise, all terms (including technical terms and scientific terms) used in this specification have the same meaning as that generally understood by those skilled in the art to which the invention belongs. It will be further understood that terms, such as those defined in commonly used dictionaries, should be interpreted as having a meaning that is consistent with their meaning in the context of the relevant art and will not be interpreted in an idealized or excessively formal sense unless so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

Figure 1B:
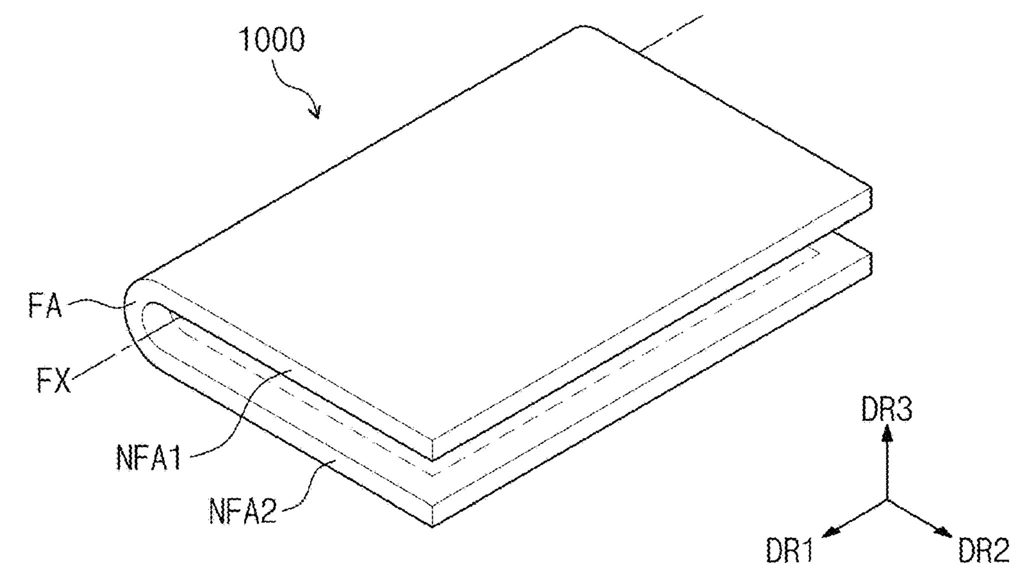
FIG. 1B is a view illustrating the display device illustrated in FIG. 1A in a folded state.

FIG. 1A is a perspective view of a display panel according to an embodiment of the invention. FIG. 1B is a view illustrating the display device illustrated in FIG. 1A in a folded state.

Referring to FIGS. 1A and 1B, an embodiment of a display device 1000 may be a foldable display device. In such an embodiment, the display device 1000 may be used for a large-sized electronic device such as a television and a monitor, and a small and medium-sized electronic device such as a mobile phone, a tablet, a vehicle navigation device, a game machine, or a smart watch.

An upper surface of the display device 1000 may be defined as a display surface DS, and when the display device 1000 is in an unfolded state, the display surface DS may be on a plane defined by a first direction DR1 and a second direction DR2. Here, a third direction DR3, which is perpendicular to the first direction DR1 and the second direction DR3, may be a thickness direction of the display device 1000.

The display surface DS may include a display region DA and a non-display region NDA around the display region DA. The display region DA is a region in which an image IM is displayed and the non-display region NDA is a region in which no image is displayed. FIG. 1A illustrates an embodiment where the image IM includes application icons, for example.

In an embodiment, the display region DA may have a rectangular shape. The non-display region NDA may surround the display region DA. However, the embodiment of the invention is not limited thereto, and the shapes of the display region DD-DA and the non-display region DD-NDA may be variously designed.

In an embodiment of the display device 1000, a first non-folding region NFA1, a folding region FA, and a second non-folding region NFA2 may be defined sequentially in the second direction DR2. In such an embodiment, the folding region FA may be defined between the first non-folding region NFA1 and the second non-folding region NFA2. FIGS. 1A and 1B illustrate an embodiment where a single folding region FA and first and second non-folding regions NFA1 and NFA2 are defined, but the numbers of the first and second non-folding regions NFA1 and NFA2 are not limited thereto. In one alternative embodiment, for example, the display device 1000 may include a plurality of non-folding regions more than two and a plurality of folding regions disposed between the non-folding regions.

In an embodiment, the display device 1000 may be folded or foldable with respect to a folding axis FX. In such an embodiment, the folding region FA may be bent with respect to the folding axis FX. The folding axis FX may extend in the first direction DR1. The folding axis FX may be defined as a short axis parallel to the short sides of the display device 1000.

When the display device 1000 is folded, the display surface of the first non-folding region NFA1 and the display surface of the second non-folding region NFA2 may face each other. Accordingly, the display surface DS may not be exposed to the outside in a folded state. However, this is merely an example, and the embodiment of the invention is not limited thereto. In an alternative embodiment of the invention, when the display device 1000 is folded, the display surface of the first non-folding region NFA1 and the display surface of the second non-folding region NFA2 may be opposite to each other without facing each other. In such an embodiment, the display surface DS may also be exposed to the outside in a folded state.

Figure 2A:
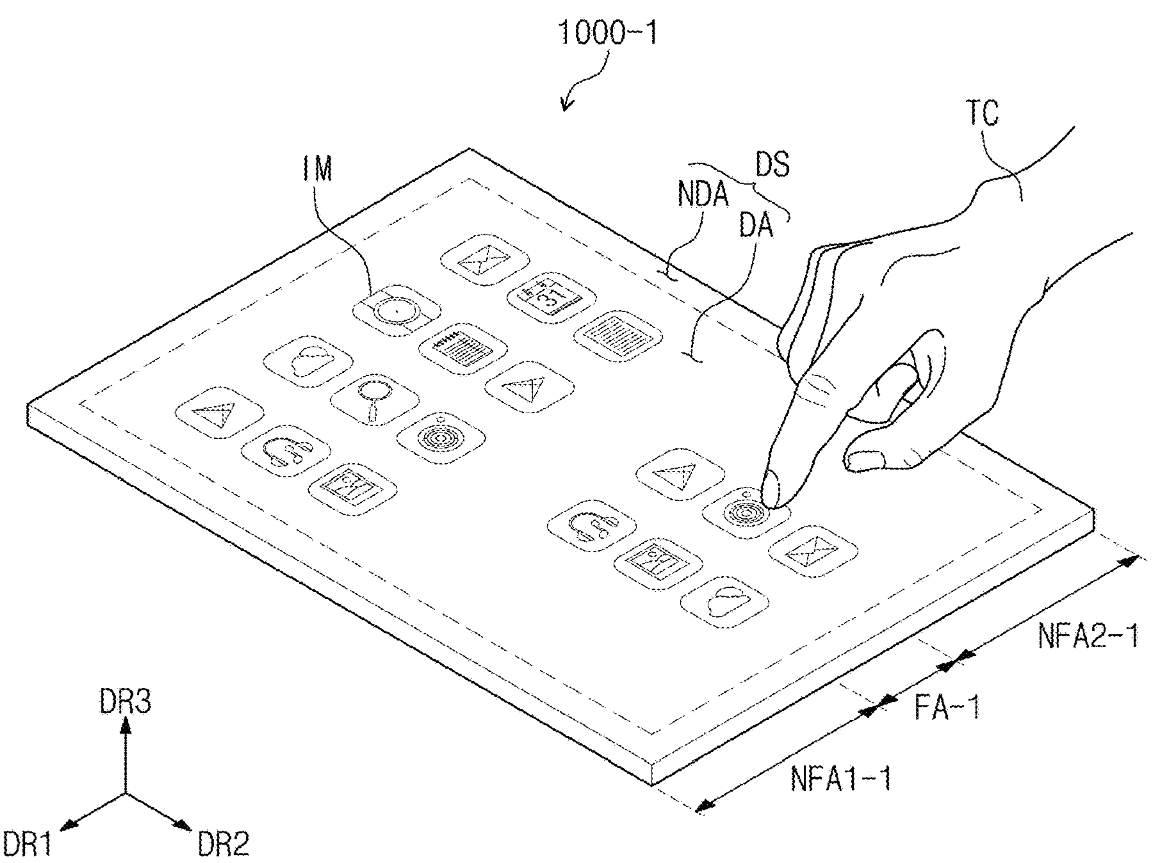
FIG. 2A is a perspective view of a display panel according to an embodiment of the invention.
Figure 2B:
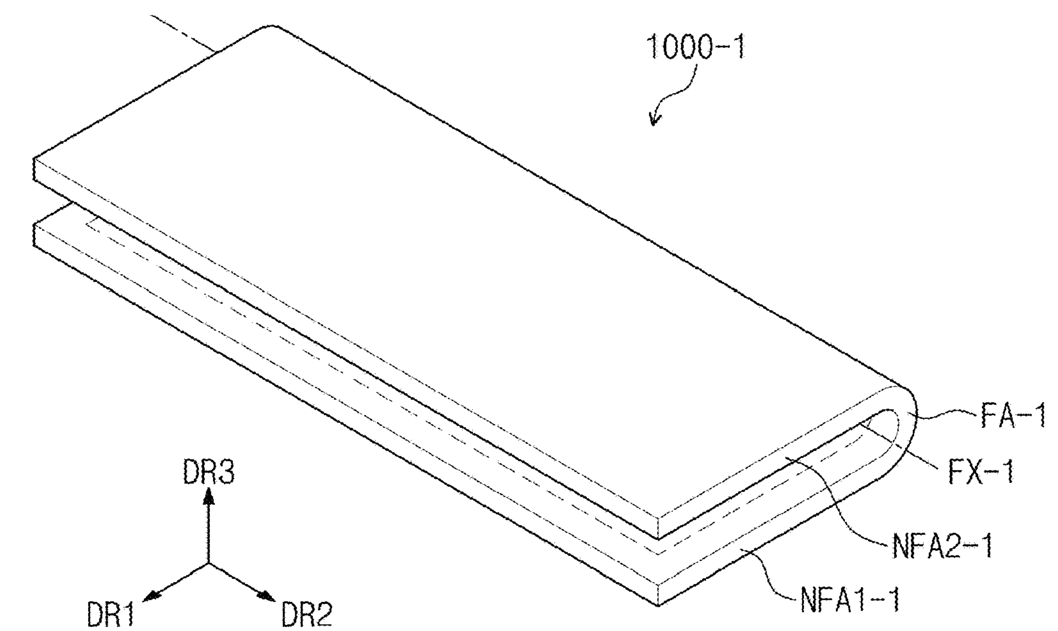
FIG. 2B is a view illustrating the display device illustrated in FIG. 2A in a folded state.

FIG. 2A is a perspective view of a display panel according to an embodiment of the invention. FIG. 2B is a view illustrating the display device illustrated in FIG. 2A in a folded state.

Referring to FIGS. 2A and 2B, in an embodiment of a display device 1000-1, a first non-folding region NFA1-1, a folding region FA-1, and a second non-folding region NFA2-1 may be defined sequentially in a first direction DR1. In such an embodiment, the folding region FA-1 may be defined between the first non-folding region NFA1-1 and the second non-folding region NFA2-1.

In an embodiment, the display device 1000-1 may be folded or foldable with respect to a folding axis FX-1. In such an embodiment, the folding region FA-1 may be bent with respect to the folding axis FX-1. The folding axis FX-1 may extend in a second direction DR2. The folding axis FX-1 may be defined as a longitudinal axis parallel to the long sides of the display device 1000-1.

Hereinafter, for convenience of description, a structure of an embodiment of a display device 1000 foldable with respect to a short axis will be described in detail, but the embodiment of the invention is not limited thereto, and the structures to be described later may also be applied to a display device 1000-1 foldable with respect to a longitudinal axis.

Figure 3A:
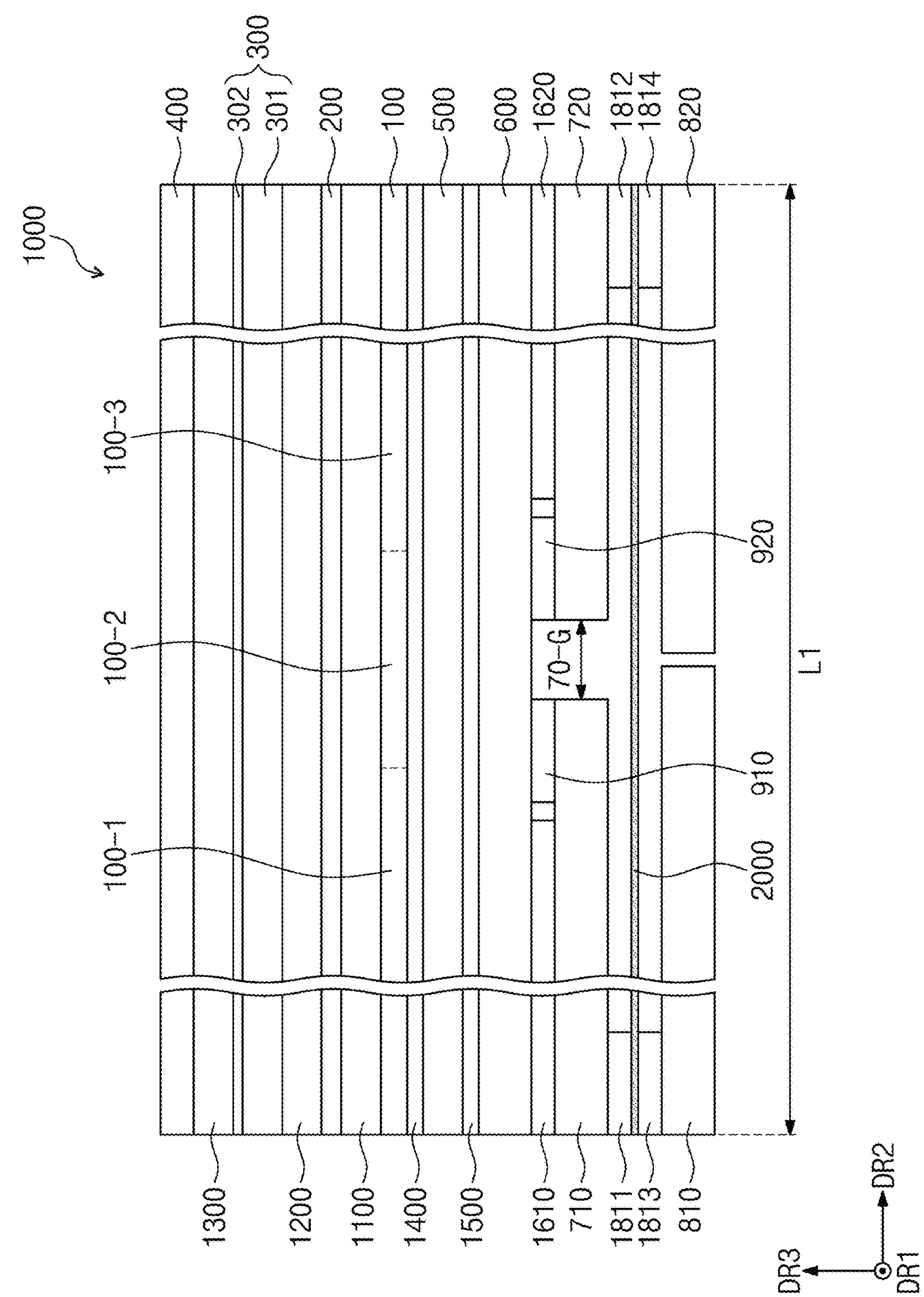
FIG. 3A is a cross-sectional view illustrating a display panel according to an embodiment of the invention.
Figure 3B:
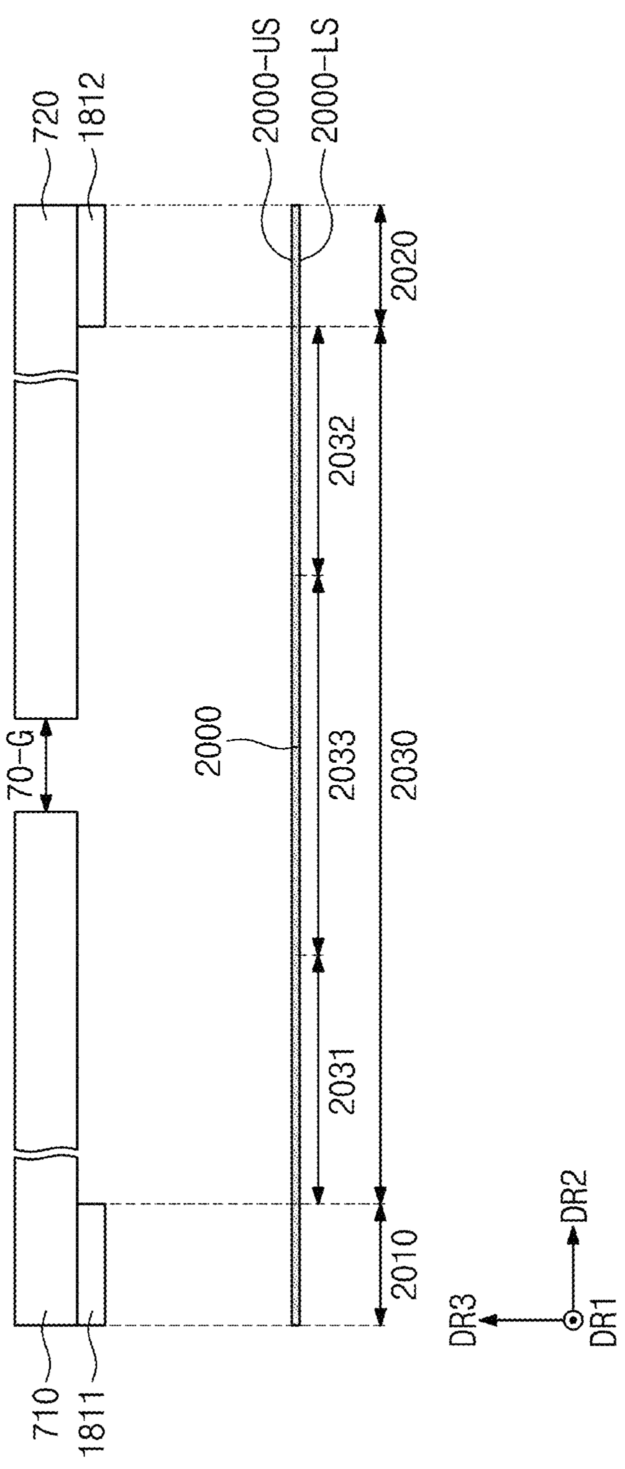
FIG. 3B is a cross-sectional view illustrating some constituents in a display device according to an embodiment of the invention.
Figure 3C:
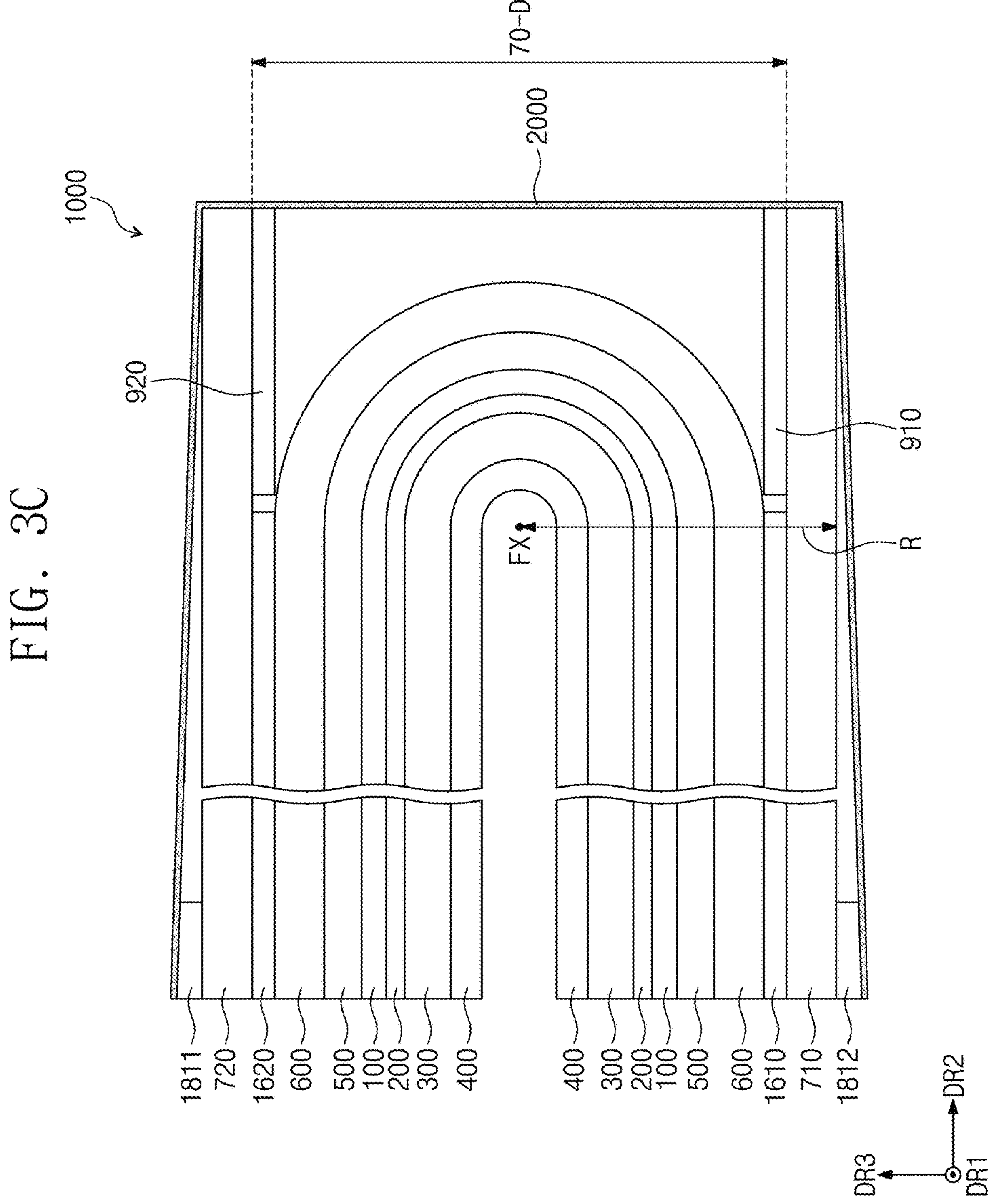
FIG. 3C is a cross-sectional view illustrating a portion of constituents of a display device in a folded state according to an embodiment of the invention.

FIG. 3A is a cross-sectional view illustrating a display panel according to an embodiment of the invention. FIG. 3B is a cross-sectional view illustrating some constituents in a display device according to an embodiment of the invention. FIG. 3C is a cross-sectional view illustrating a portion of constituents of a display device in a folded state according to an embodiment of the invention.

In FIGS. 3B and 3C, only some constituents of a display device are schematically illustrated. FIG. 3B schematically illustrates, among the constituents illustrated in FIG. 3A, a first plate 710, a second plate 720, a first adhesive layer 1811, a second adhesive layer 1812, and a cover film 2000. FIG. 3B schematically illustrates, for convenience of illustration and description, a state in which a first plate 710, a second plate 720, a first adhesive layer 1811, a second adhesive layer 1812, and a cover film 2000 are separated from each other. FIG. 3C is a view in which the adhesive layers 1100, 1200, 1300, 1400 and 1500, a first set part 810, a second set part 820, a third adhesive layer 1813 and a fourth adhesive layer 1814, which are illustrated in FIG. 3A, are omitted for convenience of illustration and description. Hereinafter, referring to FIGS. 3A and 3C, an embodiment of a display device according to the invention will be described in detail.

Referring to FIG. 3A, an embodiment of a display device 1000 may include: a display module 100, a reflection prevention layer 200, a window 300, an upper protective film 400, a lower protective film 500, a cushion layer 600, a first plate 710, a second plate 720, a first set part 810, and a second set part 820.

The display module 100 may display an image IM (see FIG. 1A) and detect an external input TC (see FIG. 1A). The external input TC may be an input of a user. The input of a user includes various types of external inputs, such as a portion of user's body, light, heat, a pen or a pressure. In an embodiment, as shown in FIG. 1A, the external input TC may be a touch by a user's hand on the display surface DS, but the embodiment of the invention is not limited thereto. In such an embodiment, as described above, the external input TC may be provided in various forms, and the external input TC applied to a side surface or a rear surface of the display device 1000 according to the structure of the display device 1000 may also detected.

The display module 100 may include a display panel that generates an image and an input detection layer for acquiring the coordinate information about external inputs.

The display panel may be a light-emitting display panel, but not being particularly limited thereto. In one embodiment, for example, the display panel may be an organic light-emitting display panel or a quantum dot light-emitting display panel. The light-emitting layer of the organic light-emitting display panel may include an organic light-emitting material. The light-emitting layer of the quantum dot light-emitting display panel may include quantum dots, quantum rods, etc.

The input detection layer may be disposed directly on the display panel. In one embodiment, for example, the input detecting layer may be formed directly on the display panel through a continuous process. The input detection layer may include a plurality of insulating layers and a plurality of conductive layers. The plurality of conductive layers may constitute a detecting electrode for detecting an external input, a detecting line connected to the detecting electrode, and a detecting pad connected to the detecting line. The input detection layer may detect an external input through a mutual cap method and/or a self-cap method. However, external input detecting methods are not limited those described above.

In an embodiment of the display module 100, a first region 100-1, a second region 100-2, and a third region 100-3 may be defined. The first display region 100-1 may correspond to the first non-folding region NFA1 of FIG. 1A, the second display region 100-2 may correspond to the folding region FA of FIG. 1A, and the third display region 100-3 may correspond to the second non-folding region NFA2 of FIG. 1A. In such an embodiment, the first region 100-1 and the third region 100-3 may be non-folding regions and the second region 100-2 may be a folding region.

The reflection prevention layer 200 may be disposed on the display module 100. The reflectivity of external light incident from an outside of the reflection preventing layer 200 may be decreased thereby. The reflection prevention layer 200 may include a retarder and a polarizer. The retarder may be of a film type or a liquid crystal coating type, and include λ/2 retarder and/or λ/4 retarder. The polarization layer may also be of a film type layer or a liquid crystal coating-type layer. The film-type may include a stretchable synthetic resin film and the liquid crystal coating type may include liquid crystals aligned in predetermined arrays. The retarder and the polarizer may further include a protective film.

Alternatively, the reflection prevention layer 200 may include color filters. The color filters may each have a predetermined array structure. The array structures of the color filters may be determined considering light-emitting colors of the pixels included in the display panel. The reflection prevention layer 200 may further include a black matrix adjacent to the color filters.

Alternatively, the reflection prevention layer 200 may include a destructive interference structure. In one embodiment, for example, the destructive interference structure may include a first reflective layer and a second reflective layer which are disposed on mutually different layers. In such an embodiment, a first reflective beam and a second reflective beam which are respectively reflected from the first reflective layer and the second reflective layer may be destructively interfered, and thus, the external light reflectivity may be decreased.

In an embodiment, as shown in FIG. 3A, an adhesive layer 1100 may be disposed between the display module 100 and the reflection prevention layer 200. The display module 100 and the reflection prevention layer 200 may be coupled to each other by the adhesive layer 1100 Alternatively, the adhesive layer 1100 may be omitted. In such an embodiment, the reflection prevention layer 200 may be formed directly on the display module 100 without a separate adhesive layer on the display module 100. In embodiments described herein, adhesive layers may include a general adhesive or a sticking agent. In such embodiments, the adhesive layers may each be a pressure sensitive adhesive ("PSA"), an optical clear adhesive ("OCA"), or an optical clear resin ("OCR"), for example.

The window 300 may be disposed on the reflection prevention layer 200. The window 300 may include a base layer 301 and a functional coating layer 302. The base layer 301 may include a glass substrate and/or a synthetic resin film, etc. In one embodiment, for example, the base layer 301 may include a polyimide film. The base layer 301 is not limited to a single layer. The base layer 301 may include two or more films coupled by an adhesive member. The functional coating layer 302 may include at least one selected from a fingerprint prevention layer, a reflection prevention layer, and a hard coating layer.

An adhesive layer 1200 may be disposed between the window 300 and the reflection prevention layer 200. However, the embodiment of the invention is not limited thereto, and the adhesive layer 1200 may be omitted.

The upper protective film 400 may be disposed on the window 300. The shock resistance characteristic of the display device 1000 may be improved by including the upper protective film 400. The upper protective film 400 may be a polymer film or a reinforced glass film. In an embodiment, an adhesive layer 1300 may be disposed between the upper protective film 400 and the window 300, but alternatively, the adhesive layer 1300 may be omitted. In an alternative embodiment of the invention, the upper protective film 400 may be omitted.

The lower protective film 500 may be disposed under the display module 100. The lower protective film 500 may be a layer that protects the rear surface of the display module 100. The lower protective film 500 may include a synthetic resin film and may be, for example, a polyimide film or a polyethylene terephthalate film. In one embodiment, for example, the lower protective film 500 may be a high-stiffness polyimide film. However, this is merely an example, and the lower protective film 500 is not limited to the above example. An adhesive layer 1400 may be disposed between the lower protective film 500 and the display module 100.

The cushion layer 600 may be disposed under the lower protective film 500. The cushion layer 600 may include sponge, a foamed form, a urethane resin, or the like. The cushion layer 600 may include a polyurethane film or a thermoplastic polyurethane film, for example. In such an embodiment, an adhesive layer 1500 may be disposed between the lower protective film 500 and the cushion layer 600. Alternatively, the adhesive layer 1500 may be omitted and the cushion layer 600 may be formed directly under the lower protective film 500.

The first plate 710 and the second plate 720 may be disposed under the cushion layer 600. The first plate 710 may be disposed under the first region 100-1 of the display module 100, and the second plate 720 may be disposed under the third region 100-3 of the display module 100. A portion of the first plate 710 and a portion of the second plate 720 may be disposed under the second region 100-2. The first plate 710 and the second plate 720 may be spaced apart a predetermined distance from each other. In such an embodiment, a predetermined gap 70-G may be defined between the first plate 710 and the second plate 720.

The first plate 710 and the second plate 720 may be metal plates. In one embodiment, for example, the first plate 710 and the second plate 720 may include stainless steel, aluminum, or an alloy thereof. The strengths of the first plate 710 and the second plate 720 may be greater than that of the display module 100.

A first intermediate adhesive layer 1610 may be disposed between the cushion layer 600 and the first plate 710. A second intermediate adhesive layer 1620 may be disposed between the cushion layer 600 and the second plate 720. Opposing surfaces of each of the first intermediate adhesive layer 1610 and the second intermediate adhesive layer 1620 may have adhesiveness.

In an embodiment, when viewed in the third direction DR3 parallel to the thickness direction of the display device 1000, the first intermediate adhesive layer 1610 may overlap the first region 100-1, and the second intermediate adhesive layer 1620 may overlap the third region 100-3. In such an embodiment, the first intermediate layer 1610 and the second intermediate layer 1620 may not overlap the second region 100-2.

A first step compensation film 910 may be disposed between the cushion layer 600 and the first plate 710. A second step compensation film 920 may be disposed between the cushion layer 600 and the second plate 720. One of two opposing surfaces of each of the first intermediate layer 1610 and the second intermediate layer 1620 may have lower adhesiveness than the other of the two opposing surfaces. In one embodiment, for example, the one surface may not have adhesiveness. The one surface that does not have adhesiveness may be a surface adjacent to the cushion layer 600.

The first step compensation film 910 may be adjacent to the first intermediate adhesive layer 1610, and the second step compensation film 920 may be adjacent to the second intermediate adhesive layer 1620. Accordingly, the first intermediate adhesive layer 1610, the first step compensation film 910, the second step compensation film 920, and the second intermediate adhesive layer 1620 may sequentially be arranged in the second direction DR2.

When viewed in a plan view or in the third direction DR3, at least a portion of the first step compensation film 910 and the second step compensation film 920 may overlap the second region 100-2. When the display module 100 is in an unfolded state, that is, when the display module 100 is in a flat state, the second region 100-2 of the display module 100 may be supported by the first step compensation film 910 and the second step compensation film 920. When the display module 100 is in a folded second state, the first step compensation film 910 and the second step compensation film 920 may be spaced apart or detached from the cushion layer 600.

Referring to FIGS. 3A and 3B, the cover film 2000 may be attached to the first plate 710 and the second plate 720. The cover film 2000 may cover at least a portion of the separate space between the first plate 710 and the second plate 720. The cover film 2000 may be disposed to overlap the gap 70-G defined between the first plate 710 and the second plate 720.

The cover film 2000 may be a flexible film. The cover film 200 may include a material robust to elongation and shrinkage. The cover film 2000 may have a material that has an elastic modulus of about 30 megapascal (MPa) and elongation of at least about 100%. In one embodiment, for example, the cover film 2000 may include at least one selected from an acrylic resin, a methacrylic resin, a polyisoprene vinyl-based resin, an epoxy-based resin, a urethane-based resin, a cellulose-based resin, a silicone-based resin, a polyimide-based resin, a polyamide-based resin, and a perylene-based resin. In one embodiment, for example, the cover film 2000 may include at least one selected from a silicone resin, a polyurethane resin, and a thermoplastic resin. In such an embodiment, the cover film 2000 may be silicone film, a polyurethane film or a thermoplastic polyurethane film.

The cover film 2000 may have a thickness in a range of about 40 micrometers (μm) to about 130 μm. The cover film 2000 may have a thickness in a range of about 50 μm to about 100 μm. In such an embodiment, if the thickness of the cover film 2000 is less than about 40 μm, the durability of the cover film 200 may be decreased and foreign substance infiltration prevention characteristic thereof may be decreased. In such an embodiment, if the thickness of the cover film 2000 exceeds about 130 μm, torque increases when folding the display device 1000 and the folding characteristic of the display device 1000 may be decreased.

The cover film 2000 may include an upper surface 2000-US and a rear surface 2000-LS. The upper surface 2000-US of the cover film 2000 may be a surface adjacent to the first plate 710 and the second plate 720, and the rear surface 2000-LS of the cover film 2000 may be a surface opposite to the upper surface 2000-US and adjacent to the first set part 810 and the second set part 820.

The cover film 2000 may include a first attachment region 2010, a second attachment region 2020, and a connection region 2030. The first attachment region 2010 may be attached to the first plate 710, and the second attachment region 2020 may be attached to the second plate 720. In one embodiment, for example, the first attachment region 2010 may be attached to the lower surface of the first plate 710, and the second attachment region 2020 may be attached to the lower surface of the second plate 720.

A first adhesive layer 1811 may be disposed between the cover film 2000 and the first plate 710, and the second adhesive layer 1812 may be disposed between the cover film 2000 and the second plate 720. The first adhesive layer 1811 may overlap the first attachment region 2010 of the cover film 2000, and the second adhesive layer 1812 may overlap the second attachment region 2020 of the cover film. The width L1 of the cover film 2000 in the second direction DR2 may correspond to the width of the display device 1000 in the second direction DR2.

FIGS. 3A and 3B illustrate an embodiment where the cover film 2000 overlaps or covers the entire surfaces of the first plate 710 and the second plate 720, but the embodiment of the invention is not limited thereto. Alternatively, the cover film 2000 may be disposed to overlap only a portion of the first plate 710 and the second plate 720. In such an embodiment, the cover film 2000 may overlap the gap 70-G defined between the first plate 710 and the second plate 720, be attached to a central portion rather than to an end of the first plate 710 via the first adhesive layer 1811, and be attached to a central portion rather than to an end of the second plate 720 via the second adhesive layer 1812. In such an embodiment, the width L1 of the cover film 2000 in the second direction DR2 may be less the width of the display device 1000 in the second direction DR2.

The first plate 710 may be coupled to the first set part 810 and the second plate 720 may be coupled to the second set part 820. The first set part 810 and the second set part 820 may include at least one selected from a camera module, a main board, a battery, and a housing. A third adhesive layer 1813 may be disposed between the cover film 2000 and the first set part 810, and a fourth adhesive layer 1814 may be disposed between the cover film 2000 and the second set part 820. The width of a region of the cover film 200 that is not attached to the first to fourth adhesive layers 1811, 1812, 1813 and 1814 may vary corresponding to a change in the shape of the display device 1000. That is, the width of the connection region 2030 in the cover film 2000 may vary corresponding to the change in the shape of the display device 1000.

The connection region 2030 may be connected between the first attachment region 2010 and the second attachment region 2020. The connection region 2030 may include a central region 2033 and peripheral regions 2031 and 2032 which are adjacent to the central region 2033. A first peripheral region 2031 may be a region between the first attachment region 2010 and the central region 2033, and a second peripheral region 2032 may be a region between the second attachment region 2020 and the central region 2033.

In an embodiment of the display device 1000 according to the invention, a low friction coating part is disposed in at least a portion of the surface of the cover film 2000. The low friction coating part may be a portion which does not degrade the stretchability of the cover film 2000 and a portion in which a coating material capable of preventing tear of the cover film due to friction and stretch is coated onto the cover film 2000. The low friction coating part is disposed on at least one surface of the cover film 2000. The low friction coating part may be disposed on at least a portion of the cover film 2000, for example, in the connection region 2030. Disposition and configuration of the low friction coating part will be described later in greater detail with reference to FIGS. 4A to 5B.

Referring to FIGS. 3A to 3C, the distance between the first plate 710 and the second plate 720 may vary according to the shape of the display device 1000. In one embodiment, for example, as illustrated in FIG. 3C, when the display device 1000 is in a folded second state, the distance 70-D between the first plate 710 and the second plate 720 may be maximum. In such an embodiment, the folding region may not be covered by the first plate 710 and the second plate 720. In such an embodiment, as a portion of the first plate 710 and a portion of the second plate 720 are spaced apart from the cushion layer 600, the rear surface of the cushion layer 600 may be exposed.

When the display device 1000 is in a folded state, one surface of the cover film 2000 may make contact with the first plate 710 and the second plate 720. When the display device 1000 is in the folded state, the upper surface 2000-US of the cover film 2000 may make contact with edges of the first plate 710 and the second plate 720. When the display device 1000 is in the folded state, a low friction coating part may be disposed in the portion of the upper surface 2000-US of the cover film 2000 which makes contact with edges of the first plate 710 and the second plate 720. In such an embodiment, when the display device 1000 is in the folded state, the low friction coating part which is coated to have a low friction characteristic may make contact with the edges of the first plate 710 and the second plate 720.

In such an embodiment the display device 1000, infiltration of foreign substances may be effectively prevented from infiltrating to the side of the cushion layer 600 and the display module 100 by the cover film 2000 disposed under the first plate 710 and the second plate 720 even in a state in which the display device 1000 is folded. In such an embodiment, when the display device 1000 is folded or in the folded state, the cover film 2000 makes contact with edge portions of the first plate 710 and the second plate 720 and causes friction, and thus, the cover film 200 may be damaged by repeated folding. In an embodiment of a display device 1000 according to the invention, a low friction coating part having a low friction characteristic is disposed on the upper surface of the cover film 2000 to secure a low friction characteristic of a portion making contact with the first plate 710 and the second plate 720 to prevent damage due to friction with edge portions of the first plate 710 and the second plate 720. Accordingly, in such an embodiment, a cover film 2000 may have high durability even when used in an environment of repeated folding environment, such that the durability and reliability of the display device 1000 may be improved.

Referring to FIGS. 3A to 3C, the width of the first attachment region 2010 in the cover film 2000 may correspond to the width of the first adhesive layer 1811 in the second direction DR2, and the width of the second attachment region 2020 in the cover film 2000 may correspond to the width of the second adhesive layer 1812 in the second direction DR2. The width of the first adhesive layer 1811 in the second direction DR2 and the width of the second adhesive layer 1812 in the second direction may each be in a range of about 3 millimeters (mm) to about 10 mm. However, the width of each of the first adhesive layer 1811 and the second adhesive layer 1812 is not limited to those described above, and may be variously modified according to product design.

Figure 4A:
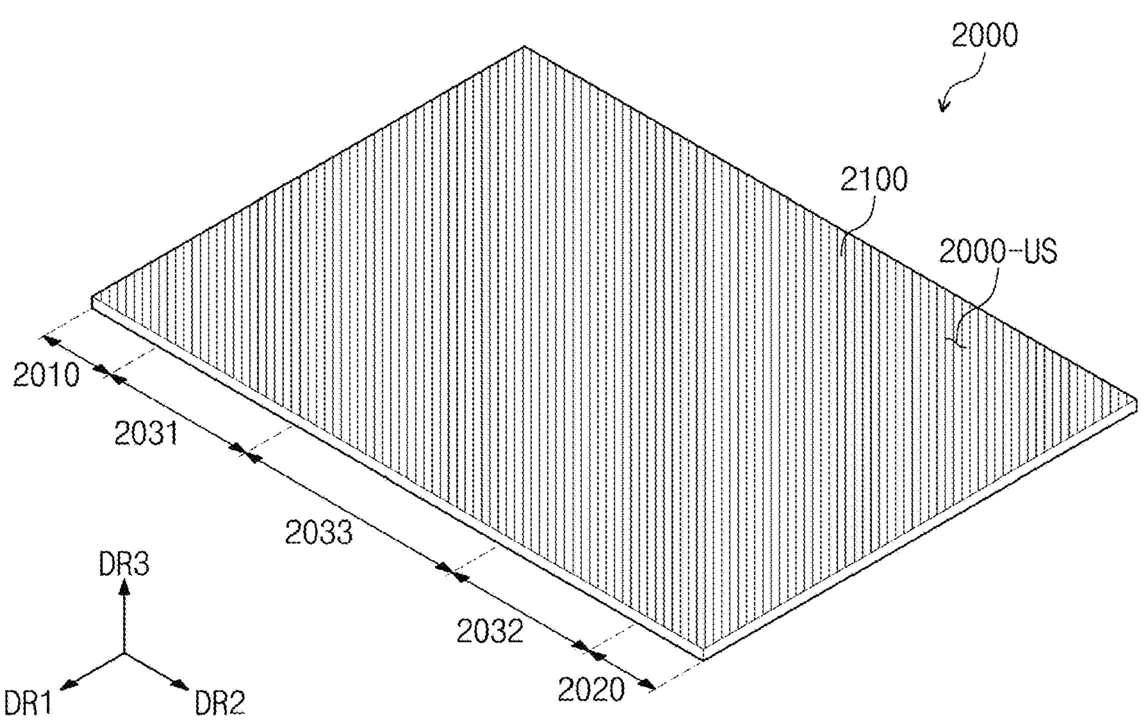
FIGS. 4A to 4C are perspective views of upper surfaces of some constituents in a display device according to an embodiment of the invention.
Figure 4B:
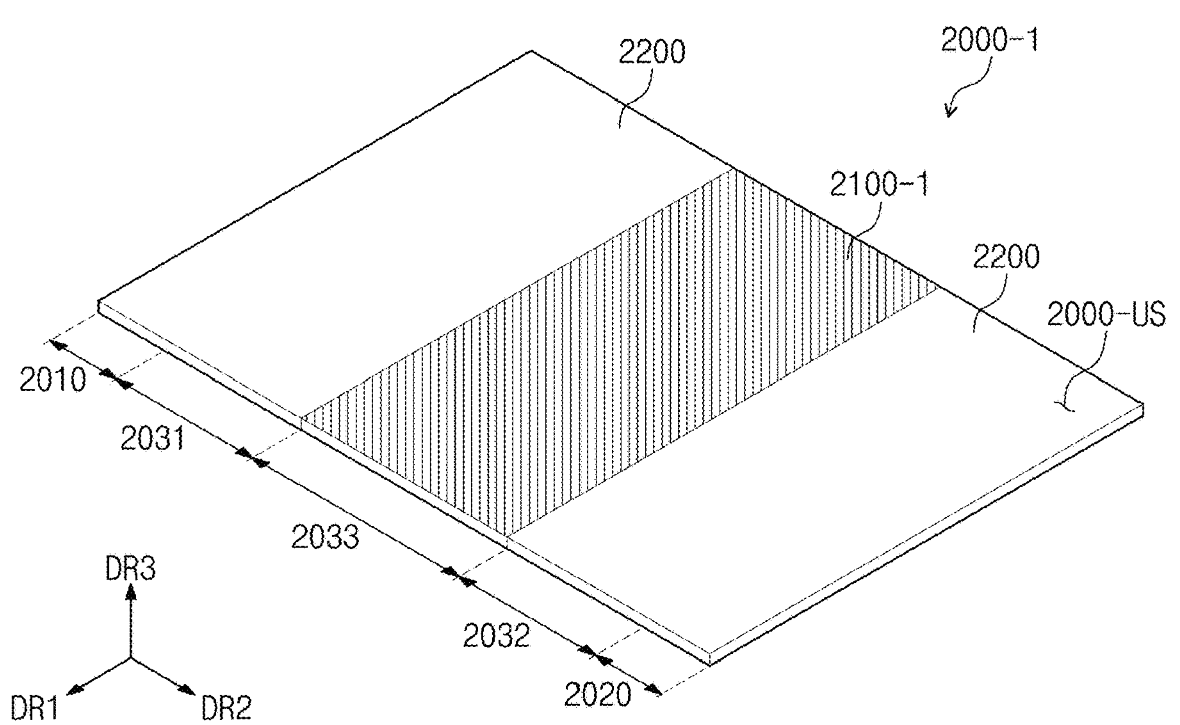
Figure 4C:
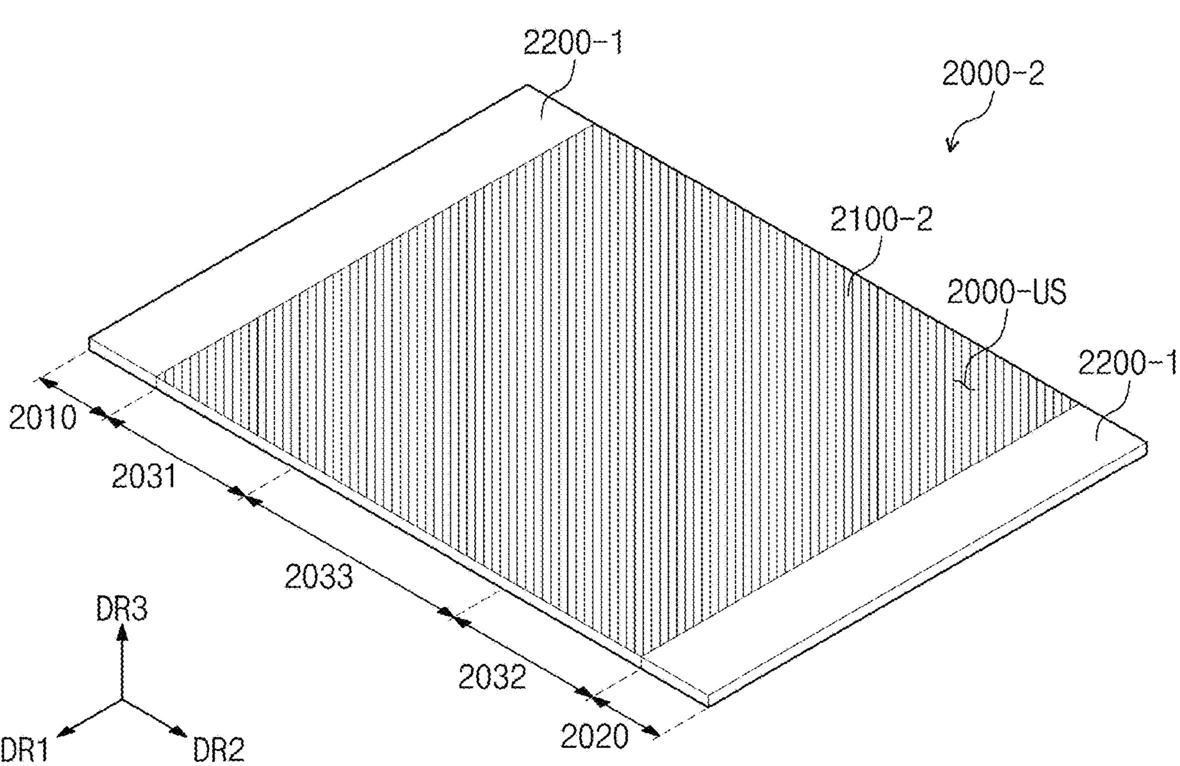
Figure 5A:
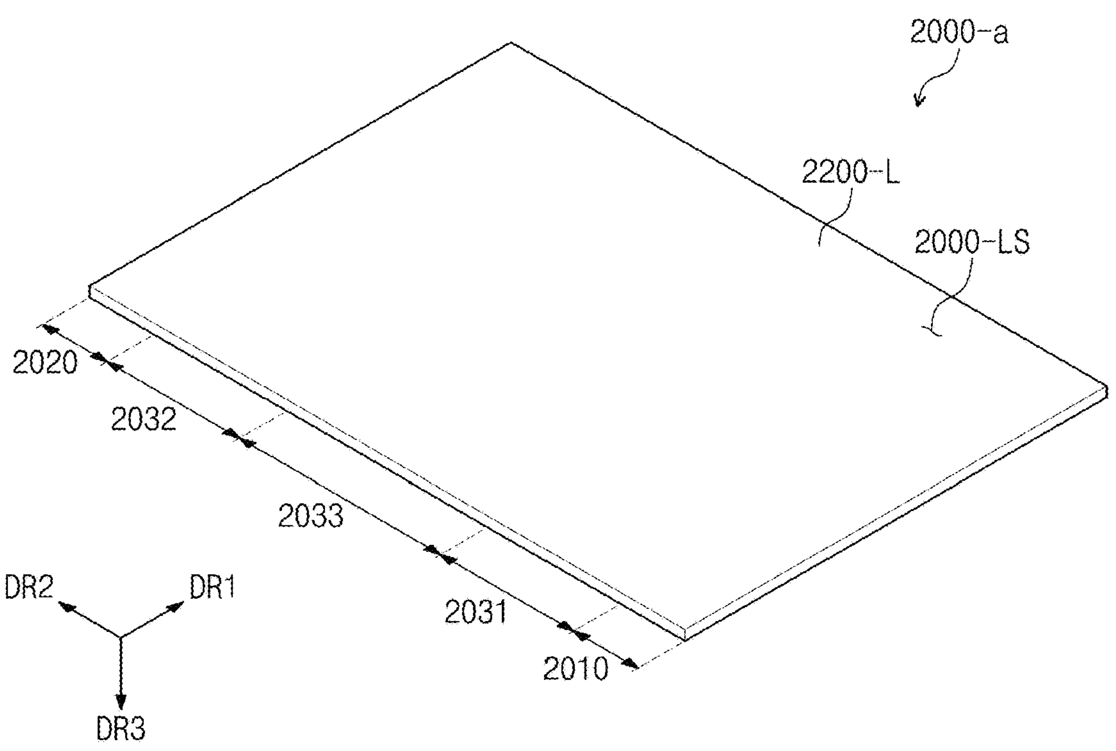
FIGS. 5A to 5B are perspective views of rear surfaces of some constituents in a display device according to an embodiment of the invention.
Figure 5B:
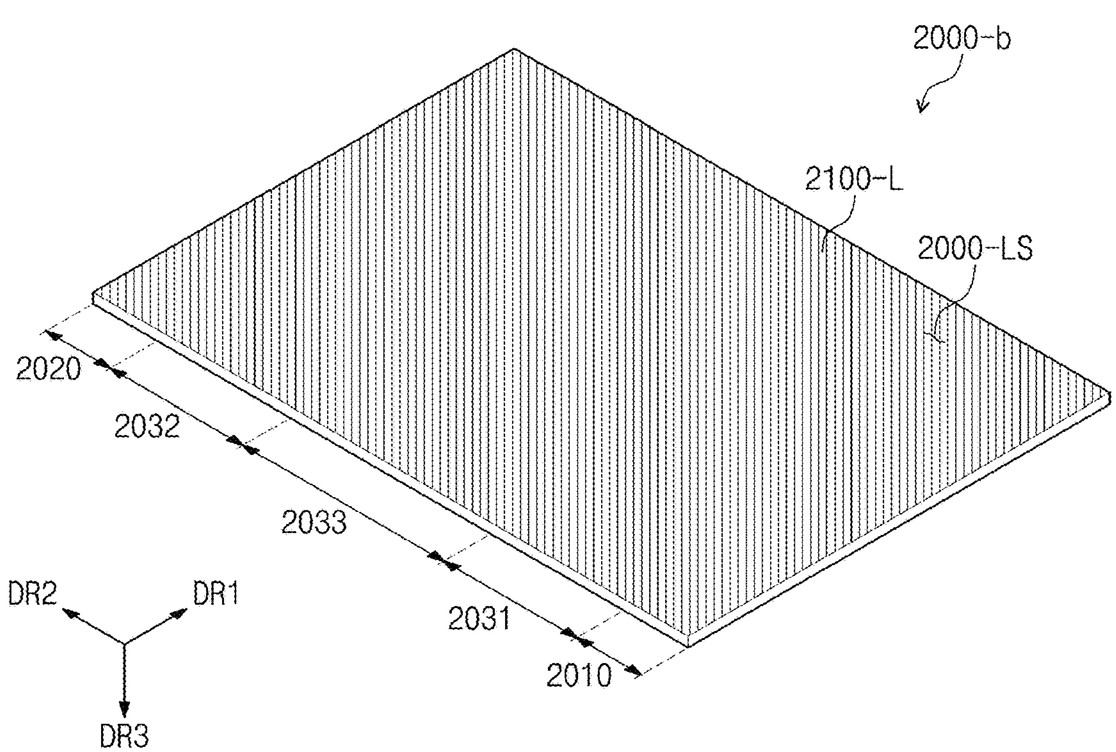

FIGS. 4A to 4C are perspective views of upper surfaces of some constituents in a display device according to an embodiment of the invention. FIGS. 5A to 5B are perspective views of rear surfaces of some constituents in a display device according to an embodiment of the invention. FIGS. 4A to 4C illustrate perspective views of upper surfaces 2000-US of embodiments of a cover film 2000-1 and 2000-2 included in a display device. FIGS. 5A to 5B illustrate perspective views of upper surfaces 2000-US of embodiments of a cover film 2000-*a* and 2000-*b* included in a display device.

Referring together to FIGS. 3A, 3B and 4A, a low friction coating part 2100 is included in the upper surface 2000-US of the cover film 2000 according to an embodiment, and the low friction coating part 2100 may be disposed on the entire upper surface 2000-US. In such an embodiment, the low friction coating part 2100 may be disposed entirely on a first attachment region 2010, a second attachment region 2020, and a connection region 2030.

In an embodiment, the low friction coating part 2100 may include an anti-scratch material coated on the upper surface 2000-US of the cover film 2000 to improve the anti-scratch characteristic of the cover film 2000. In an embodiment, the low friction coating part 2100 may include fluorine resin coating or acrylic resin coating coated on the upper surface 2000-US of the cover film 2000. The fluorine resin may include at least one selected from polytetrafluoroethylene ("PTFE"), perfluoroalkoxy ("PFA"), fluorinated ethylene propylene ("FEP"), ethylene tetrafluoroethylene ("ETFE") and ethylenechlorotrifluoroethylene ("ECTFE"). The acrylic resin may include a resin prepared by polymerization of acrylate monomers. The acrylic resin may be a resin including beads of about 0.1 μm or greater.

Referring together to FIGS. 3A, 3B, 4B and 4C, embodiments of the low friction coating part 2100-1 and 2100-2 may be included in the upper surface 2000-US of the cover films 2000-1 and 2000-2, and the low friction coating parts 2100-1 and 2100-2 may be disposed only on a portion of the upper surface 2000-US.

In an embodiment, as illustrated in FIG. 4B, the low friction coating part 2100-1 may be disposed only on a central region in the upper surface 2000-US of the cover film 2000-1. A non-coating part 2200, in which a low friction coating part 2100-1 is not disposed, may be defined on the upper surface 2000-US of the cover film 2000-1 in a first attachment region 2010, a second attachment region 2020, and peripheral regions 2031 and 2032 excluding a central region 2033. The non-coating part 2200 may be a portion in which separate coating is not applied on the upper surface of the cover film 2000-1.

Referring together to FIGS. 3B and 4B, in an embodiment, the width L1 of the cover film 2000-1 may be in a range of about 60 mm to about 220 mm. In such an embodiment of the cover film 2000-1, the width of the connection region 2030 may be in a range of about 50 mm to about 200 mm. The width of the central region 2033 in the connection region 2030 may correspond to the minimum width of a portion in which the low friction coating part 2100-1 is defined. The width of the central region 2033 may be greater than the size of the gap 70-G defined between the first plate 710 and the second plate 720. The width of the central region 2033 may be in a range of about 5 mm to about 50 mm. The width of the central region 2033 may be in a range of about 10% to about 40% of the entire width of the connection region 2030. The width of the central region 2033 may vary according to the folding characteristic of the display device 1000. In an embodiment, when the display device 1000 is a folded state, the width of the central region 2230 may satisfy the following Formula 1, where the minimum distance between the folding axis FX and the first plate 710 is denoted by R and the width of the central region 2230 is denoted by L2.

$$2*R<L2 \quad \text{[Formula 1]}$$

In such an embodiment, the width (L2) of the central region 2033 may be greater than two times the minimum distance (R) from the folding axis FX to the lower surface of the first plate 710. As the width of the central region 2033 satisfies the above numerical range and Formula 1, damage to the cover film 2000 due to friction with edge portions of the first plate 710 and the second plate 720 may be effectively prevented.

In an alternative embodiment, as illustrated in FIG. 4C, the low friction coating part 2100-2 may be disposed only on connection regions 2031, 2032 and 2033 in the upper surface 2000-US of the cover film 2000-2 according to an embodiment. The low friction coating part 2100-2 may be disposed in the peripheral regions 2031 and 2032 and the central region 2033 in the upper surface 2000-US of the cover film 2000-2, and the non-coating part 2200-1, in which the low friction coating part 2100-2 is not disposed, may be defined in the first attachment region 2010 and the second attachment region 2020 excluding the peripheral regions 2031 and 2032 and the central region 2033. The non-coating part 2200-1 may be a portion in which separate coating is not applied on the upper surface of the cover film 2000-2. In such an embodiment, as in FIG. 4C, the low friction coating part 2100-2 is disposed only in the connection regions 2031, 2032 and 2033 in the upper surface 2000-US of the cover film 2000-2, and thus, the low friction coating part is formed in the connection regions 2031, 2032 and 2033 in which friction with the plate and stretch occur during folding such that damage to the cover film 2000 may be effectively prevented. In such an embodiment, and a non-coating part, in which coating is not performed, is defined in a portion attached to an adhesive layer such that degradation of the adhesive characteristic may be effectively prevented.

Referring to FIGS. 5A and 5B, a low friction coating part may be or not be formed on a rear surface 2000-LS of cover films 2000-*a* and 2000-*b*. In an embodiment, as illustrated in FIG. 5A, a low friction coating part is not formed on the rear surface 2000-LS of the coating film 2000-*a*, but a non-coating part 2200-L, in which separate coating is not performed, may be defined. Alternatively, as illustrated in FIG. 5B, a low friction coating part 2100-L may entirely be formed on the rear surface 2000-LS of the cover film 2000-*b*. Alternatively, although not shown, a low friction coating part may also be formed on only a portion of the rear surface of the cover film as in the embodiment illustrated in FIGS. 4B and 4C. Deposition of a low friction coating part on the rear surface 2000-LS of the cover films 2000-*a* and 2000-*b* may be variously modified according to a method for forming the low friction coating part. In an embodiment, a low friction coating part may be formed only on the upper surface of the cover film through spray coating, and no friction low friction coating part may be formed on the rear surface of the cover film. In an alternative embodiment, low friction coating parts may be formed on both the upper surface and rear surface of the cover film through dip coating.

Figure 6:
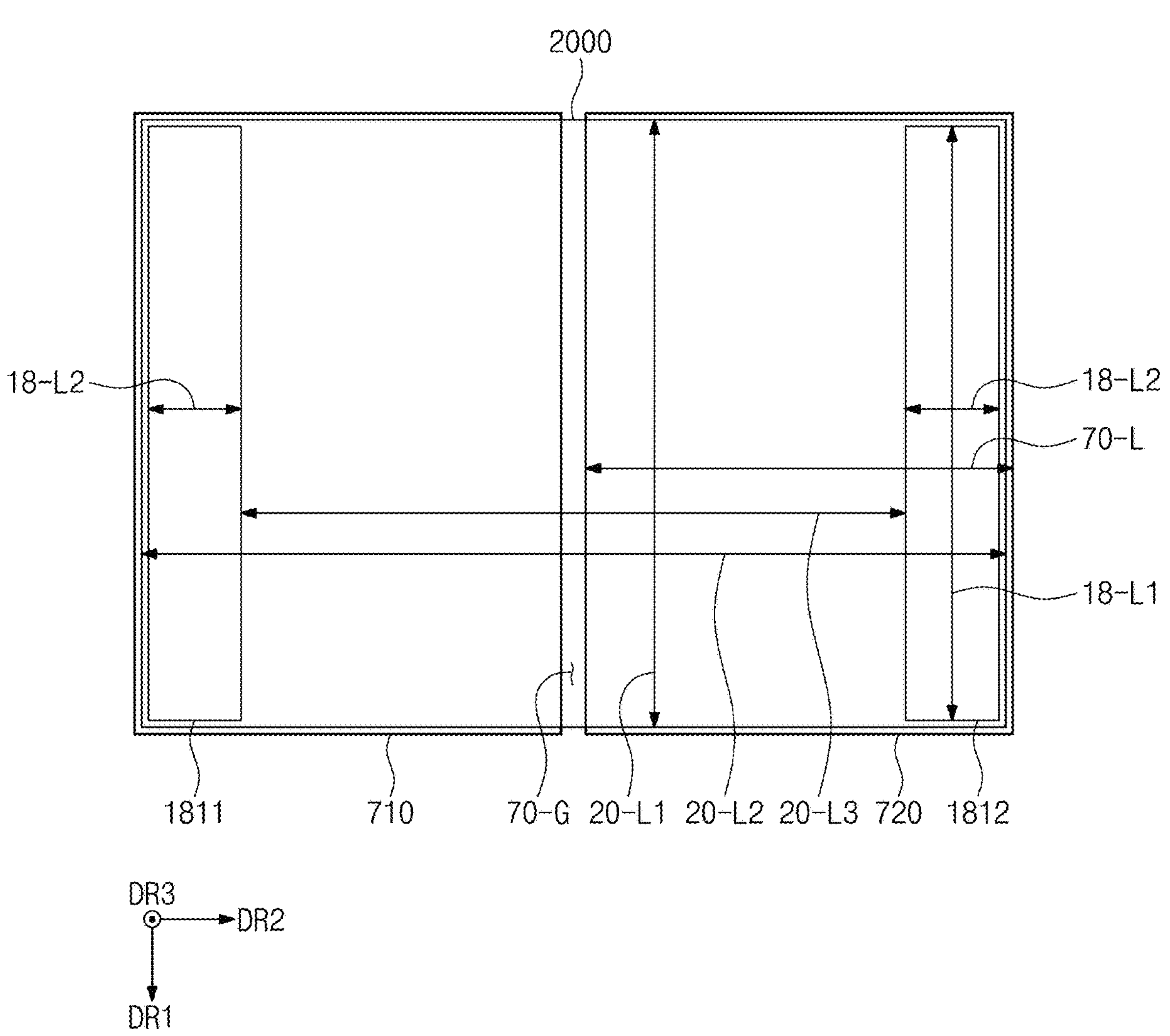
FIG. 6 is a plan view illustrating some constituents of a display panel according to an embodiment of the invention.

FIG. 6 is a plan view illustrating some constituents of a display device according to an embodiment of the invention. For convenience of illustration, FIG. 6 only illustrates a first plate 710, a second plate 720, a cover film 2000, a first adhesive layer 1811, and a second adhesive layer 1812 of a display device.

Referring to FIG. 6, each of the first adhesive layer 1811 and the second adhesive layer 1812 may have a shape extending in a first direction DR1. The width (or length) 18-L1 of each of the first adhesive layer 1811 and the second adhesive layer 1812 in the first direction DR1 may substantially be the same as the width (or length) 20-L1 of the cover film 2000 in the first direction DR1.

The width 18-L2 of each of the first adhesive layer 1811 and the second adhesive layer 1812 in a second direction DR2 may be less than the width 70-L of each of the first plate 710 and the second plate 720 in the second direction DR2. In one embodiment, for example, the width 18-L2 of each of the first adhesive layer 1811 and the second adhesive layer 1812 in a second direction DR2 may be about 5 mm. However, the width 18-L2 is not limited to the above example, and may be variously changed according to product design.

A first width 20-L2 of the cover film 2000 is defined in the second direction DR2, and a second width 20-L3 of a portion of the cover film 2000 not attached to the first adhesive layer 1811 and the second adhesive layer 1812 is defined in the second direction DR2. The second width 20-L3 may vary corresponding to a change in the shape of the display device 1000 (see FIG. 3A).

In one embodiment, for example, the first width 20-L2 of the cover film 2000 may be about 110 mm, and the width 18-L2 of each of the first adhesive layer 1811 and the second adhesive layer 1812 in a second direction DR2 may be about 5 mm. In such an embodiment, the second width 20-L3 of the portion of the cover film 2000 may be about 100 mm. A gap 70-G between the first plate 710 and the second plate 720 may be about 750 μm in the second direction DR2 when the display device 1000 is in an unfolded state. When the display device 1000 (see FIG. 3C) is in a folded state, the distance 70-D (see FIG. 3C) between one end of the first plate 710 and one end of the second plate 720 may increase. In one embodiment, for example, when the display device 1000 (see FIG. 3C) is in a folded state with a folding radius of curvature of about 2 mm, the distance 70-D may increase to about 4,000 μm. In such an embodiment, the difference between the second width 20-L3 in the unfolded state and the second width 20-L3 in the folded state may be about 3.25 mm. The change ratio of the second width 20-L3 in the folded state to the unfolded state may be about 103.25%. The cover film 2000 may be stretched corresponding to the change ratio.

Although not shown, a third adhesive layer 1813 (see FIG. 3A) may have a shape corresponding to the first adhesive layer 1811, and a fourth adhesive layer 1814 (see FIG. 3A) may have a shape corresponding to the second adhesive layer 1812.

Figure 7:
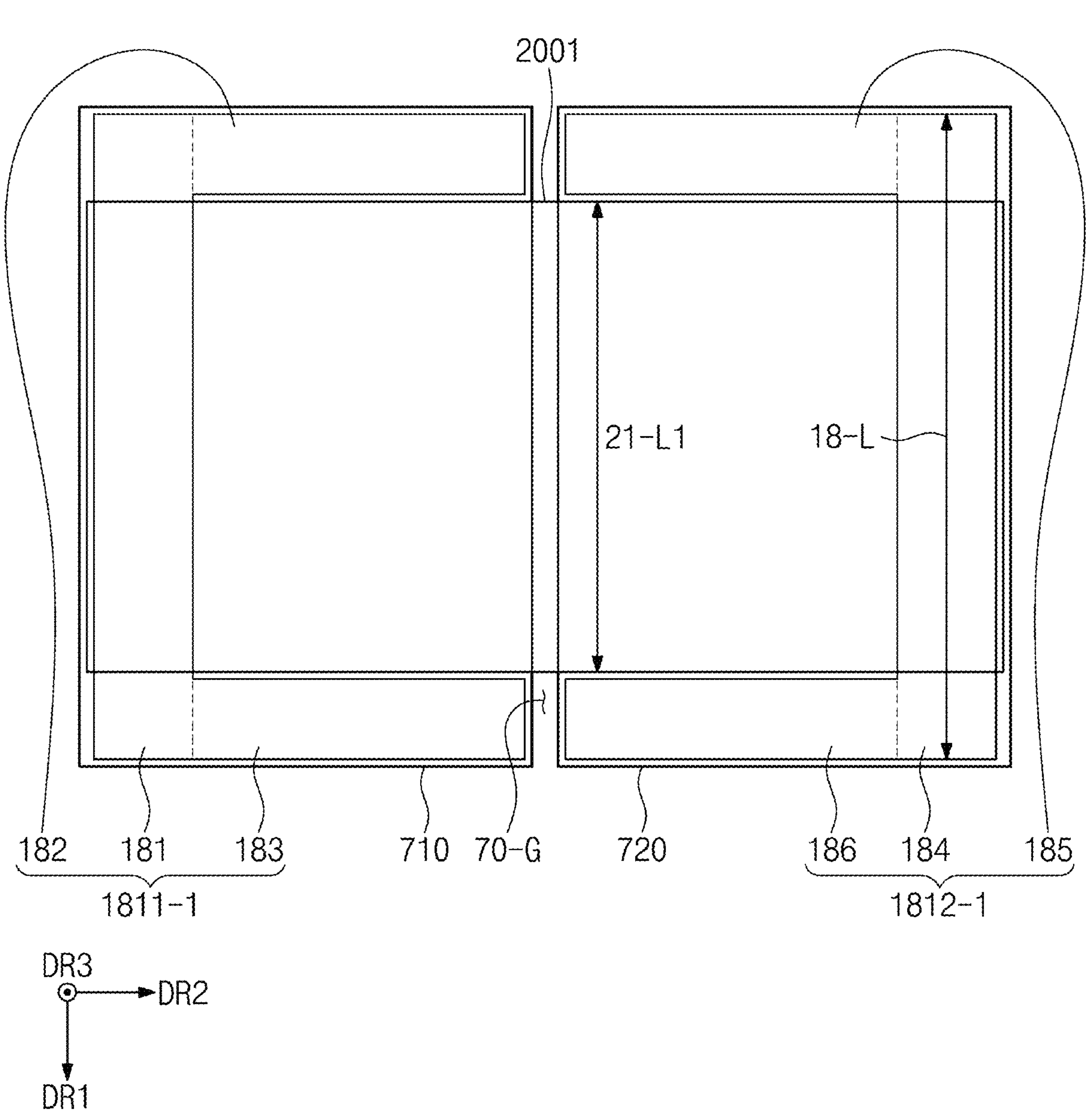
FIG. 7 is a plan view illustrating some constituents of a display panel according to an embodiment of the invention.

FIG. 7 is a plan view illustrating some constituents of a display device according to an embodiment of the invention. For convenience of illustration, FIG. 7 only illustrates a first plate 710, a second plate 720, a cover film 2001, a first adhesive layer 1811-1, and a second adhesive layer 1812-1 of a display device.

Referring to FIG. 7, the first adhesive layer 1811-1 may include a first adhesive region 181, a second adhesive region 182, and a third adhesive region 183, and the second adhesive layer 1812-1 may include a fourth adhesive region 183, a fifth adhesive region 185 and a sixth adhesive region 186.

Each of the first adhesive region 181 and the fourth adhesive region 184 may extend in a first direction DR1. The width 18-L of each of the first adhesive region 181 and the fourth adhesive region 184 in the first direction DR1 may correspond to the maximum width of each of the first adhesive layer 1811-1 and the second adhesive layer 1812-1 in the first direction DR1.

The second adhesive region 182 may extend in a second direction DR2 from one end of the first adhesive region 181, and the third adhesive region 183 may extend in the second direction DR2 from the other end of the first adhesive region 181. The fifth adhesive region 185 may extend in the second direction DR2 from one end of the fourth adhesive region 184, and the sixth adhesive region 186 may extend in the second direction DR2 from the other end of the fourth adhesive region 184. The second adhesive region 182, the third adhesive region 183, the fifth adhesive region 185 and the sixth adhesive region 186 may be disposed between the first adhesive region 181 and the fourth adhesive region 184.

The width 21-L1 of the cover film 2001 in the first direction DR1 may be less than the width 18-L of each of the first adhesive region 181 and the fourth adhesive region 184 in the first direction DR1. The cover film 2001 may be attached only to the first adhesive region 181 and the fourth adhesive region 184, and not be attached to the second adhesive region 182, the third adhesive region 183, the fifth adhesive region 185 and the sixth adhesive region 186. When viewed in a plan view or in the third direction DR3, the cover film 2001 may be disposed between the second adhesive region 182 and the third adhesive region 183, and between the fifth adhesive region 185 and the sixth adhesive region 186.

Although not shown, a third adhesive layer 1813 (see FIG. 3A) may have a shape corresponding to the first adhesive layer 1811-1, and a fourth adhesive layer 1814 (see FIG. 3A) may have a shape corresponding to the second adhesive layer 1812-1. In one embodiment, for example, the second adhesive region 182 and the third adhesive region 183 may be attached to the third adhesive layer 1813 (see FIG. 3A), and the fifth adhesive region 185 and the sixth adhesive region 186 may be attached to the fourth adhesive layer 1814 (see FIG. 3A).

Hereinafter, an embodiment of an electronic device according to an embodiment will be described in detail with reference to examples and comparative examples. Examples described below are merely provided for better understanding of embodiments of the invention, and the scope of the invention is not limited thereto.

Table 1 below illustrates folding characteristic evaluation data according to examples corresponding to embodiments of the invention and comparative examples. Examples 1 to 4 in Table 1 shows the folding characteristic evaluation data of the display device in which a cover film included in the display device includes a low friction coating part as in an embodiment of the invention, and the material and thickness of the cover film satisfies the range of the embodiment of the invention. Comparative example 1 shows the folding characteristic evaluation data of a display device which includes a polyethylene terephthalate film ("PET") film at the position of a cover film instead of a silicon film or a thermoplastic polyurethane ("TPU") film. Comparative examples 2 to 5 show the folding characteristic evaluation data of a display device in which a low friction coating part is not formed on the surface of a cover film. Comparative examples 6 to 7 show the folding characteristic evaluation data of a display device which has a cover film with a relatively large thickness.

TABLE 1

| Division | Cover film material | Cover film thickness (μm) | Surface treatment | Folding test result | Defect causing number of folding |
|---|---|---|---|---|---|
| Example 1 | TPU | 50 | Fluorine resin coating | Good | >200K |
| Example 2 | TPU | 100 | Fluorine resin coating | Good | >200K |
| Example 3 | Silicone | 50 | Fluorine resin coating | Good | >400K |
| Example 4 | Silicone | 100 | Fluorine resin coating | Good | >400K |
| Comparative example 1 | PET | 50 | Fluorine resin coating | Opening/closing impossible (no stretchability) | — |
| Comparative example 2 | TPU | 50 | X | Cover film damage | <200 |
| Comparative example 3 | TPU | 100 | X | Cover film damage | <300 |
| Comparative example 4 | Silicone | 50 | X | Cover film damage | <500 |
| Comparative example 5 | Silicone | 100 | X | Cover film damage | <700 |
| Comparative example 6 | TPU | 150 | Fluorine resin coating | Opening/closing impossible (large torque) | — |
| Comparative example 7 | Silicone | 150 | Fluorine resin coating | Opening/closing impossible (large torque) | — |

Referring to results of Table 1, as described above, a cover film included in a display device includes a low friction coating part according to an embodiment of the invention, and the material and thickness of the cover film satisfies the scope of the embodiment of the invention. Thus, it may be confirmed that even in a condition of about 200 thousand times or 400 thousand times of repeated folding, damage to the cover film may not occur without degradation in stretchability. As in comparative example 1, when a cover film does not include a silicone film, a urethane film, or a thermoplastic polyurethane film but includes a PER film or the like, it may be confirmed that opening/closing of a display device is impossible due to high stiffness. In comparative examples 2 to 6, when a cover film does not include a low friction coating part, that is, does not include a fluorine resin, it may be confirmed that damage to the cover film, such as tear, may occur even in a small number of repeated folding such as about 700 times. As in comparative examples 6 and 7, when a cover film has a large thickness such as about 150 μm, it maybe confirmed that opening/closing of a display device is impossible due to a large increase in torque. As show in Table 1, a display device including a cover film, in which a low friction coating part is provided and the material and thickness of the cover film satisfies the range described herein, may have an improved folding characteristic due to the cover film while the foreign substance infiltration prevention characteristic is improved.

According to an embodiment of the invention, in a cover film that covers a region between a first plate and a second plate, portions to be in contact with edges of the first plate and the second plate may include a low friction coating part to have anti-scratch property. Accordingly, damage to the cover film due to folding may be effectively prevented, while preventing foreign substances infiltrating between the first plate and the second plate, and thus, the reliability of the display device may be improved.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:
a display module, in which a first region, a second region, and a third region are sequentially defined in one direction;
a first plate disposed under the first region of the display module;
a second plate disposed under the third region of the display module and spaced apart from the first plate;
a cover film disposed under the first plate and the second plate and attached to the first plate and the second plate; and
a low friction coating part disposed under the first plate and the second plate and disposed on at least a portion of a surface of the cover film, and
wherein the low friction coating part on the cover film does not contact the first plate and the second plate when the display module is in a flat state, and the low friction coating part on the cover film contacts the first plate and the second plate when the display module is in a folded state.

2. The display device of claim 1, wherein the cover film comprises at least one selected from a silicone resin, a polyurethane resin, and a thermoplastic polyurethane resin.

3. The display device of claim 1, wherein a thickness of the cover film is in a range of about 40 micrometers to about 130 micrometers.

4. The display device of claim 1, wherein the low friction coating part comprises at least one selected from a fluorine resin and an acrylic resin, which is coated on the surface of the cover film.

5. The display device of claim 1, wherein the cover film comprises:
a first attachment region attached to the first plate;
a second attachment region attached to the second plate; and
a connection region which connects the first attachment region and the second attachment region to each other, and
at least a portion of the low friction coating part overlaps the connection region in a plan view.

6. The display device of claim 5, wherein:
the first attachment region of the cover film is attached to a lower surface of the first plate; and
the second attachment region of the cover film is attached to a lower surface of the second plate.

7. The display device of claim 5, wherein the connection region comprises:
a central region in which the low friction coating part is disposed; and
a peripheral region adjacent to the central region.

8. The display device of claim 1, further comprising:
a first adhesive layer disposed between the cover film and the first plate; and
a second adhesive layer disposed between the cover film and the second plate.

9. The display device of claim 1, further comprising:
a set part disposed under the cover film.

10. The display device of claim 1, wherein:
a gap is defined between the first plate and the second plate; and
the low friction coating part overlaps the gap when viewed in a plan view.

11. The display device of claim 1, wherein the first region and the third region are non-folding regions, and the second region is a folding region.

12. The display device of claim 1, wherein:
a portion of the first plate are disposed under the second region, and
a portion of the second plate are disposed under the second region.

13. The display device of claim 1, wherein
the display module is in the flat state in which the second region is flat, or in a folded state in which the second region is folded and the first region and the third region are disposed to face each other.

14. The display device of claim 1, wherein the cover film is a flexible film.

15. The display device of claim 1, wherein the cover film comprises:
an upper surface adjacent to the first plate and the second plate; and
a lower surface opposite to the upper surface, and
the low friction coating part is disposed on the upper surface.

16. The display device of claim 1, further comprising:
a window disposed on the display module and spaced apart from the first plate and the second plate with the display module therebetween.

17. A display device comprising:
a display module in a flat state or in a folded state;
a first plate disposed under the display module;
a second plate disposed under the display module and spaced apart from the first plate;
a cover film disposed under the first plate and the second plate and attached to the first plate and the second plate; and
a low friction coating part under the first plate and the second plate and disposed on a surface of the cover film to overlap a gap between the first plate and the second plate when viewed in a plan view, and
wherein the low friction coating part on the cover film does not contact the first plate and the second plate when the display module is in the flat state, and the low friction coating part on the cover film contacts the first plate and the second plate when the display module is in the folded state.

18. The display device of claim 17, wherein:
the cover film comprises at least one selected from a silicone resin, a polyurethane resin and a thermoplastic polyurethane resin, and
the low friction coating part comprises at least one selected from a fluorine resin and an acrylic resin, which is coated on the surface of the cover film.

19. The display device of claim 17, wherein the cover film comprises:
an upper surface adjacent to the first plate and the second plate; and
a lower surface opposite to the upper surface, and the low friction coating part is disposed on the upper surface.

20. The display device of claim 17, wherein the cover film comprises:

a first attachment region attached to the first plate;

a second attachment region attached to the second plate; and a connection region which connects the first attachment region and the second attachment region to each other, and at least a portion of the low friction coating part overlaps the connection region in the plan view.

* * * * *